Jan. 19, 1932.                W. V. ARTHUR                1,841,393
                              SHOULDER REST
                           Filed May 6, 1930          2 Sheets-Sheet 1

INVENTOR
William V. Arthur
BY
F. P. Gorin
ATTORNEY

Jan. 19, 1932.    W. V. ARTHUR    1,841,393
SHOULDER REST
Filed May 6, 1930    2 Sheets-Sheet 2

INVENTOR
William V. Arthur
BY F. P. Lorin
ATTORNEY

Patented Jan. 19, 1932

1,841,393

UNITED STATES PATENT OFFICE

WILLIAM VAUGHAN ARTHUR, OF SEATTLE, WASHINGTON

SHOULDER REST

Application filed May 6, 1930. Serial No. 450,295.

This invention relates to improvements in shoulder rests, and has for its principal object to provide a rest for a violin in proper relation to the body of the performer so as to meet certain definite and scientific reasons.

In the use of violins it has been definitely ascertained that the instrument should conform to three different degrees of angularity, viz: (a) the angle at which the instrument projects from the body of the performer in a horizontal plane, (b) the angularity of the instrument within a vertical plane, and (c) the degree of angularity with which the instrument itself is turned upon its longer axis.

An important feature of this invention is that the device of my invention is readily attachable to any violin and need not be detached from the violin when it is necessary to place it into its usual receptacle.

Another important feature is that there are but few points of contact between the device and the violin, with the result that the tone of the instrument is not appreciably dampened. The device is not resilient and consequently maintains its contour even under pressure. When adjusted, the device is firmly fixed in the predetermined position with respect to the violin, which is obviously important. The device is very light and there are no metallic clamps or the like involved. It is artistic in appearance and in construction strong and durable and may be applied to a large number of sizes of violins.

Other features and objects will appear as the invention is more fully hereinafter explained in the following specification, shown in the accompanying drawings, and finally pointed out in the appended claims.

In the drawings:—

Figure 1:
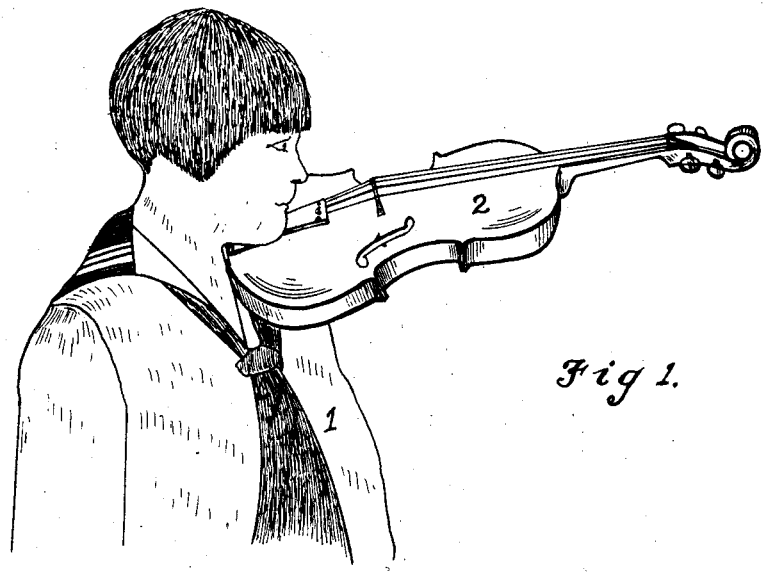
Figure 1 is a side elevation of a performer showing the violin in proper position.

Referring now more particularly to the drawings, reference numeral 1 indicates the body of the performer, 2 the violin, 3 the head of the performer. 4 indicates the improved shoulder rest, which is made of very light material, preferably cork, and covered either with light leather or, if desired, a coating of suitable varnish or the like.

Figure 3:
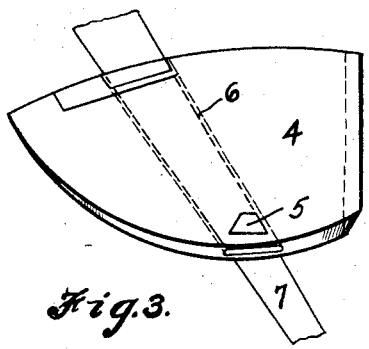
Figure 3 is an enlarged fragmentary plan view of the device.
Figure 4:
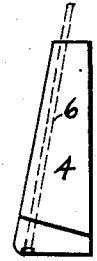
Figure 4 is an end elevation.

5 indicates a small projection from the device which is adapted to contact with the violin. The member 4 is channeled, as indicated in dotted lines at 6, (Figures 3 and 4). The channel runs obliquely through the body 4. Through the channel is slidably passed a strap 7 having a section of elastic material 8, such as rubber web or the like. 9 indicates the usual U-shaped clamp, by means of which the usual chin rest 9—a is secured to the violin, and to which one end of the strap is attached. Upon the opposite end of the strap is a hook 10.

Figure 5:
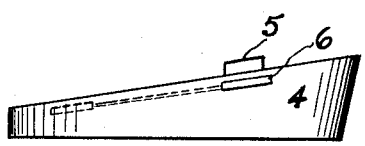
Figure 5 is an edgewise view.
Figure 7:
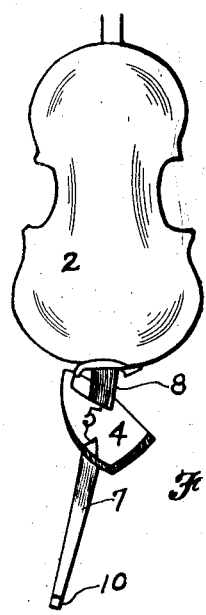
Figure 7 is a similar view with the device in pendant relation and ready to be either folded so as to allow it to be placed into the usual case or to be attached in operative position.

One end of the device is thicker than its opposite end, as viewed in Figure 5, whereby when the violin is positioned upon the body of the performer it will take the exact angle, vertically considered, as plainly seen in that figure. The body 4, as viewed in Figure 4, is likewise shorter upon one of its ends than it is upon its opposite end, so that the violin will be turned or tilted upon its longer axis at the correct angle, as best seen in Figure 1.

Figure 2:
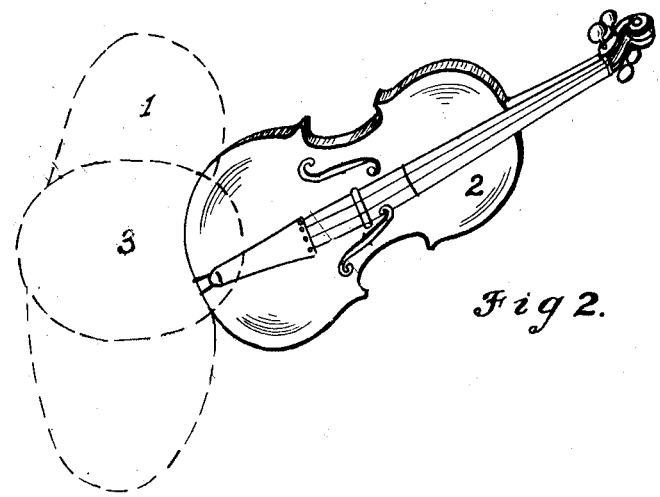
Figure 2 is a plan view of Figure 1.

The larger end of the body 4 is at an angle with respect to its base line, (Figure 5) which, when the violin is in the position stated, will cause it to project from the performer's body at the correct angle in a lateral plane, thus giving the three correct angles of projection, as best seen in Figure 2.

Figure 6:
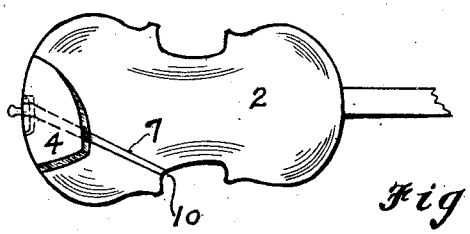
Figure 6 is a bottom plan view of the violin with my device applied thereto in operative position.
Figure 8:
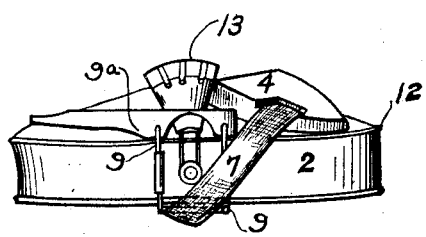
Figure 8 is an end view of a violin showing the device folded back ready to be placed in its case.

When it is desired to position the device operatively upon the violin, the hook 10 of the strap 7 is passed around the under side of the violin and the hook 10 is attached to the bead of one of the lower middle bouts, as illustrated in Fig. 6, and the strap, of course, be held in that position without shifting with respect to the violin, due to the slight stretching of the elastic portion 8 when the hook 10 is passing over the bead. The relatively small point 5 is the point of contact between the body 4 and the violin. When it is desired to return the violin to its usual case, all that is necessary is to unhook the hook 10 and place the shoulder rest on the upper side of the violin, which will allow the instrument to go into its case and have its lid closed as usual because the highest point of the body 4 is in a plane lower than the highest point of the violin which, of course, is its usual bridge 13.

Heretofore this has not been possible in devices of this character, it being necessary to remove the device entirely in order to put it into its case, and then to replace it when it is desired for use.

While I have shown and described a particular form of embodiment of my invention, I am aware that many minor changes will readily suggest themselves to those skilled in the art without departing from the spirit and scope of my invention. I, therefore, desire to avoid being limited to the particular form of embodiment which I have hereinabove shown and described.

Having described my invention, what I claim as new and desire to protect by Letters Patent is:—

1. A shoulder rest for violins comprising a body having a transverse channel therethrough, one side of said body having a projection adapted to contact with said violin, the opposite side of said body being inclined with respect to said violin-engaging side, one end of said body being thicker than the other end, said first mentioned end being cut at an acute angle with respect to said violin-engaging side, and means cooperating with said channel to support said rest in operative position on said violin, whereby by contact between the performer's body and said shoulder rest said violin is correctly positioned.

2. A shoulder rest of violins comprising a body having a transverse channel therethrough, one side of said body having a projection adapted to contact with said violin, the opposite side of said body being inclined with respect to said violin-engaging side, one end of said body being thicker than the other end, said first mentioned end being cut at an acute angle with respect to said violin-engaging side, and a strap cooperating with said channel to support said rest in operative position on said violin, whereby by contact between the performer's body and said shoulder rest said violin is correctly positioned.

In testimony whereof I affix my signature.

WILLIAM VAUGHAN ARTHUR.